United States Patent
Yang et al.

(10) Patent No.: US 9,713,858 B2
(45) Date of Patent: Jul. 25, 2017

(54) METAL PLATE LOADING/UNLOADING AND CUTTING METHOD AND SYSTEM

(71) Applicant: BAOSHAN IRON & STEEL CO., LTD., Shanghai (CN)

(72) Inventors: Saidan Yang, Shanghai (CN); Ruimin Wu, Shanghai (CN); Wenhai Jin, Shanghai (CN); Yuming Wang, Shanghai (CN); Shengbo Pan, Shanghai (CN); Qian Xiang, Shanghai (CN); Qi Yan, Shanghai (CN); Chengguo Jin, Shanghai (CN); Junliang Qiao, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 68 days.

(21) Appl. No.: 14/758,711

(22) PCT Filed: Apr. 28, 2014

(86) PCT No.: PCT/CN2014/076314
§ 371 (c)(1),
(2) Date: Jun. 30, 2015

(87) PCT Pub. No.: WO2014/177027
PCT Pub. Date: Nov. 6, 2014

(65) Prior Publication Data
US 2016/0039049 A1    Feb. 11, 2016

(30) Foreign Application Priority Data

Apr. 28, 2013 (CN) .......................... 2013 1 0157674

(51) Int. Cl.
*B23K 26/00* (2014.01)
*B23K 26/38* (2014.01)
(Continued)

(52) U.S. Cl.
CPC .......... *B23K 26/38* (2013.01); *B23K 37/0217* (2013.01); *B23K 37/0408* (2013.01); *B23K 37/0211* (2013.01)

(58) Field of Classification Search
CPC .............. B23K 26/0604; B23K 26/083; B23K 26/0838; B23K 26/0846; B23K 26/38;
(Continued)

(56) References Cited

U.S. PATENT DOCUMENTS 4,392,766 A * 7/1983 Blunt ....................... B25J 9/045
271/107
5,192,848 A    3/1993 Miyakawa et al.
(Continued)

FOREIGN PATENT DOCUMENTS

CN    201799777 U    4/2011
CN    102756251 A    10/2012
(Continued)

OTHER PUBLICATIONS

PCT International Search Report, PCT/CN2014/076314, Jul. 25, 2014, 6 pages.

*Primary Examiner* — Sang Y Paik
(74) *Attorney, Agent, or Firm* — Quarles & Brady LLP (57) ABSTRACT

A metal plate loading/unloading and cutting method and system comprises: a block cart and a sheet cart both of which are arranged on a guide rail; a cutting operation unit arranged at one side of the guide rail; a carrying and stacking robot arranged between the cutting operation unit and the guide rail of the block cart and the sheet cart, a robot external shaft being parallel to the cart guide rail and extending over two fast moving table waiting stations of the cutting operation unit; and a waste material conveying device arranged below the two cutting stations of the cutting operation unit. The present invention can effectively increase material utilization efficiency and further enlarge the range in produc-
(Continued)

tion and machining, and is especially suitable for providing production of small-batch vehicle models and trial production of new vehicle models.

17 Claims, 4 Drawing Sheets

(51) Int. Cl.
*B23K 37/04* (2006.01)
*B23K 37/02* (2006.01)

(58) Field of Classification Search
CPC ........ B23K 37/0211–37/0223; B23K 37/0229; B23K 37/0408; B23K 2201/18; B23K 2203/04; B23K 26/0884; B23K 26/40; B23K 26/702; B23K 37/00; B23K 37/0235
USPC .......................................... 219/121.6–121.83
See application file for complete search history.

(56) References Cited

U.S. PATENT DOCUMENTS

| | | | | |
|---|---|---|---|---|
| 5,229,571 A * | 7/1993 | Neiheisel | ............... | B23K 26/10 219/121.63 |
| 5,326,218 A * | 7/1994 | Fallas | ...................... | B25J 9/106 414/733 |
| 5,637,243 A * | 6/1997 | Sato | ...................... | B23K 26/706 219/121.67 |
| 6,046,428 A * | 4/2000 | Serruys | ............... | B23K 26/0838 219/121.67 |
| 2002/0084259 A1* | 7/2002 | Bertuzzi | ................ | B23K 10/00 219/121.39 |
| 2007/0257012 A1* | 11/2007 | Wile | .................. | B23K 26/0673 219/121.7 |
| 2010/0122970 A1* | 5/2010 | Caristan | ................ | B23K 26/38 219/121.72 |

FOREIGN PATENT DOCUMENTS

| | | |
|---|---|---|
| CN | 202479706 U | 10/2012 |
| CN | 103600170 A | 2/2014 |
| CN | 103600171 A | 2/2014 |
| CN | 103600173 A | 2/2014 |
| JP | 2000094071 A | 4/2000 |
| JP | 2008023571 A | 2/2008 |

* cited by examiner

METAL PLATE LOADING/UNLOADING AND CUTTING METHOD AND SYSTEM

CROSS-REFERENCE TO RELATED APPLICATIONS

This application represents the national stage entry of PCT International Application No. PCT/CN2014/076314 filed Apr. 28, 2014, which claims priority of Chinese Patent Application No. 201310157674.8 filed Apr. 28, 2013, the disclosures of which are incorporated by reference here in their entirety for all purposes.

FIELD OF THE INVENTION

The present invention relates to metal machining and in particular to a metal plate loading/unloading and cutting method and system in the technical field of automobile manufacturing.

BACKGROUND

A conventional automobile plate blanking method is die blanking, and a steel plant or an entire car plant generally has an automatic uncoiling-cutting-stacking production line. The apparatus comprises a conveying unit, a press unit and a stacking unit.

With the above-mentioned die blanking method, a material sheet of a simple shape (such as a rectangular, trapezoidal or arc shape) can be processed by way of swing-cutting, and a material sheet of a complex curve shape is processed by die blanking. It is required to provide the blanking line with different blanking dies depending on the size of a material sheet of a vehicle model, and to produce different material sheets by exchanging the dies. In the automobile manufacturing field, the metal plate blanking line has a very high operation efficiency, generally of 4,000,000-6,000,000 sheets per year. It is about 25 sheets per minute on average, on the basis of 3,800 hours per year.

However, although the above-mentioned die blanking method is suitable for large-scale mass production of ordinary vehicle models, there are still certain limitations, especially the following problems:

high costs in manufacturing and storing blanking dies; high space requirements for die stacking and maintenance room; and plant building investments due to large press equipment and equipment foundation. Particularly, for a small-batch production of some personalized vehicle models, the above-mentioned die blanking method is uneconomic.

In recent years, with rapid development of the laser technology, the cutting speed (for a steel plate with a thickness less than 1.5 mm, the cutting speed can be kept not less than 20 m/min when using a 4 KW optical fiber laser generator) and photoelectric conversion efficiency (more than 20% at present) of laser rays are continuously increasing, so that the laser cutting cost reaches a critical point so as to make it possible to apply laser cutting to large-scale blanking machining of profiled sheet metals.

It is known that some companies and research institutes at home and abroad have begun to study laser blanking of automobile plates. For example, Chinese patent CN 102105256 A to Automatic Feed Company provides a progressive laser cutting device for high-speed cutting. In the device provided in this patent, on each door frame, at least one movable laser head performs a laser cutting operation. However, this method has many technical difficulties; for example, simultaneous operation of multiple cutting heads can hardly ensure alignment of cuts generated by cutting operations of multiple devices, and a deviation in the plate shape will affect the cut shape. Huge configuration and occupied area of multiple sets of laser cutters and cutting units also cause a high equipment investment.

SUMMARY

An object of the present invention is to provide a metal plate loading/unloading and cutting method and a system therefor, which can effectively process waste cut materials to increase the material utilization and can further enlarge the range in production and machining, and is especially suitable for providing production of small-batch vehicle models and trial production of new vehicle models.

To achieve the above-mentioned object, a technical solution of the present invention is provided as follows.

A metal plate loading/unloading and cutting system is provided. The system comprises: a block cart and a sheet cart both of which are arranged on a guide rail; a cutting operation unit arranged at one side of the guide rail and comprising a first and a second fast moving table arranged in parallel and a laser cutting head, the two fast moving tables being arranged perpendicular to the guide rail and each provided with a cutting station and a waiting station, the laser cutting head moving over the two cutting stations along its guide rail, and the waiting stations corresponding to the side of the guide rail of the block cart and the sheet cart; a carrying and stacking robot arranged between the cutting operation unit and the guide rail of the block cart and the sheet cart, a robot external shaft being parallel to the cart guide rail and extending over the waiting stations of the first and the second fast moving tables of the cutting operation unit; and a waste material conveying device disposed below the two cutting stations of the cutting operation unit.

Furthermore, a replaceable liner die is provided at the cutting station, a support device is arranged on the liner die below the position corresponding to the sheets and the recyclable waste material, and the rest of the liner die is a hollow left for blanking.

Further, a recyclable waste material cart is further comprised which can move in and out simultaneously with the sheet cart.

Still further, at least one segmented flue is comprised which is arranged corresponding to the two cutting stations of the cutting operation unit.

The waste material conveying device comprises a waste material chute arranged below the cutting stations and a corresponding waste material conveying belt for conveying the waste material to the outside.

The fast moving table is for single-side feeding and discharging.

A moving mechanism of the laser cutting head is in the form of a rectangular-coordinate robot, and can move in X-, Y- and Z-direction.

Also provided is a 2D sensor, which is provided on the moving mechanism of the laser cutting head and coupled to a laser cutting controller. The 2D sensor is used for measuring the position of each block on the two fast moving table cutting stations, and the measured data are processed and computed by a controller to obtain the offset from origin and deflection angle of the placement station of the block to perform automatic correction of the cutting path.

A metal plate loading/unloading and cutting method is provided according to the present invention. Firstly, blocks are laid out according to the shape of the sheets, and conveyed and stacked by a block cart; a block at a stacking station is carried by a carrying and stacking robot to a waiting station of a first fast moving table, then the block is moved by the first fast moving table to a cutting station, the block at the cutting station is cut into sheets by a laser cutting head along a predetermined cutting path, and at the same time a block is carried by the carrying and stacking robot to a waiting station of a second fast moving table; after the completion of cutting on the first fast moving table, the laser cutting head moves to a cutting station of the second fast moving table to perform cutting, and at the same time the cut sheets on the first fast moving table are moved to the waiting station and then carried by the carrying and stacking robot to a sheet cart for conveying to the outside, stacking and package; this process is repeated, blocks and sheets are alternately moved by the first and second fast moving tables into and out of the cutting stations, and the laser cutting head moves between the cutting stations of the first and second fast moving tables to accomplish cutting of the blocks; and the cut-away waste material is moved out of the cutting operation unit by a waste material conveying device below the cutting stations.

Furthermore, the present invention also adopts a liner die design, in which the liner die corresponds to the blocks laid out according to the shape of the sheets and the recyclable waste material, a support device is arranged on the liner die below the positions corresponding to the sheets and the recyclable waste material, and the rest of the liner die is a hollow left for blanking; and the liner die is disposed at the cutting station of a fast moving table, blocks are supplied as a stack to a block stacking station, a block is picked up, by the carrying and stacking robot, from the stacking station to the liner die of the cutting operation unit, and the laser cutting performs a cutting operation on the block to form required sheets.

Also, the carrying and stacking robot uses an end effector for picking up and placing operations.

The end effector performs picking up and placing operations by way of a vacuum sucker.

In addition, the liner die of the present invention is processed from an aluminium profile, and one liner die is suitable for more than one kind of sheets.

The beneficial effects of the present invention are as follows:

through reasonable layout of the cutting stations, the carrying and stacking robot, the loading of blocks, and the unloading of sheets, the present invention changes the machining cutting method and system in an original steel plant, and also solves the problem of small-batch production requirements, thereby achieving the effect of cost reduction. Moreover, the present invention has a production line having a small occupied area and low costs in equipment investment, can meet the requirement of production of small-batch vehicle models, and thereby can obtain metal sheets with a good cut cross-section, make use of waste materials, save raw materials, increase the material utilization, and further enlarge the range of materials to be machined.

DETAILED DESCRIPTION

With reference to FIGS. 1-6, a metal plate loading/unloading and cutting system of the present invention comprises: a block cart 1 and a sheet cart 2 both of which are arranged on a guide rail 3; a cutting operation unit 4 arranged at one side of the guide rail and comprising a first and a second fast moving table 5, 6 arranged in parallel and a laser cutting head 7, the two fast moving tables 5, 6 being arranged perpendicular to the guide rail 3 and each provided with a cutting station 51, 61 and a waiting station 52, 62, the laser cutting head 7 moving over the two cutting stations 51, 61 along its guide rail, and the waiting station 52, 62 corresponding to the side of the guide rail 3 of the block cart 1 and the sheet cart 2; a carrying and stacking robot 9 arranged between the cutting operation unit 4 and the guide rail 3 of the block cart and the sheet cart, a robot external shaft 8 being parallel to the cart guide rail 3 and extending over the two fast moving table waiting stations 52, 62 of the cutting operation unit 4; and a waste material conveying device 10 arranged below the two cutting stations 51, 61 of the cutting operation unit 4.

Figure 5:
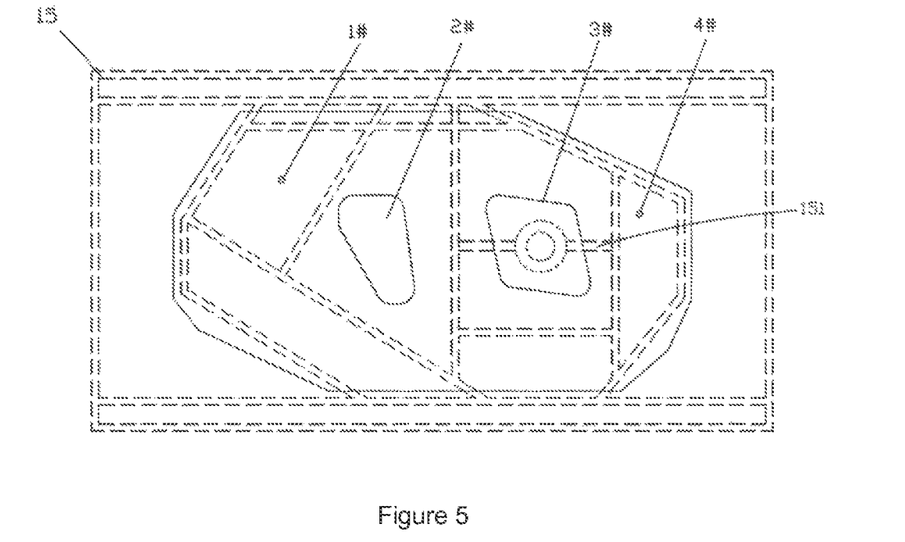
FIG. 5 is a schematic view of the liner die used in an embodiment of the present invention.

Furthermore, a replaceable liner die 15 is provided at the cutting station, a support device is arranged on the liner die below the position corresponding to the sheets and the recyclable waste material, and the rest of the liner die is a hollow left for blanking.

Figure 1:
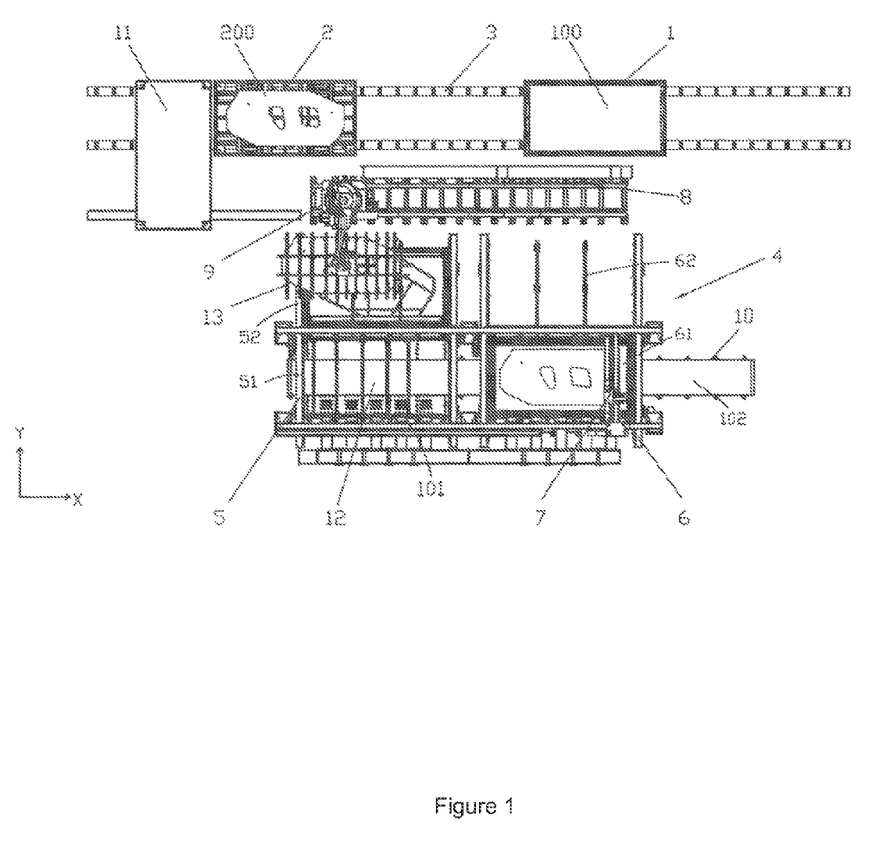
FIG. 1 is a top view of an automobile plate blanking system according to an embodiment of the present invention.

Further, a recyclable waste material cart 11 is further comprised which can move in and out simultaneously with the sheet cart 2.

Still further, at least one segmented flue 12 is further comprised which is arranged corresponding to the two cutting stations 51, 61 of the cutting operation unit 4.

The waste material conveying device 10 comprises a waste material chute 101 arranged below the cutting stations 51, 61 and a corresponding waste material conveying belt 102 for conveying the waste material to the outside.

Figure 3:
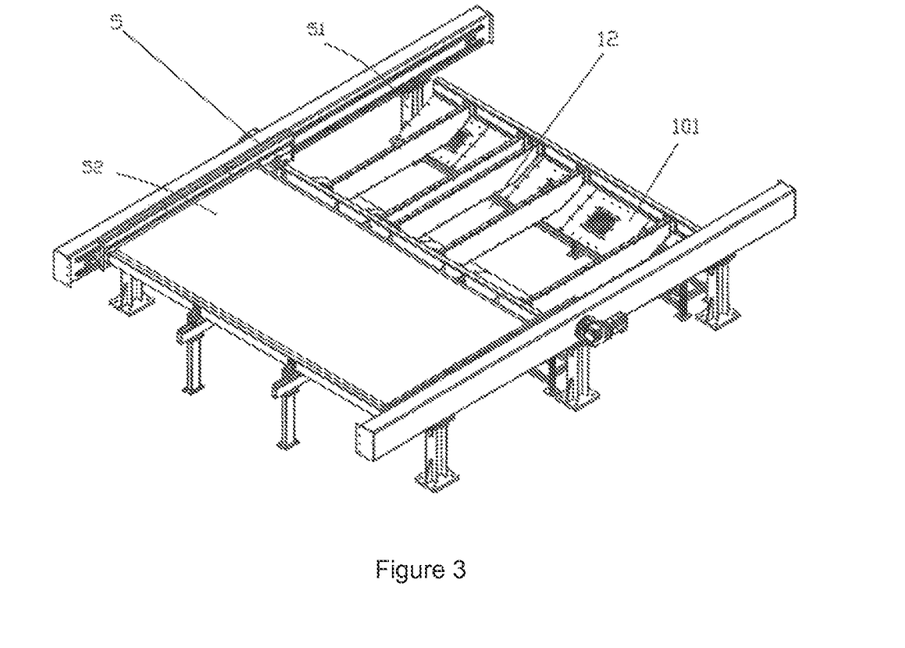
FIG. 3 is a schematic view of a fast moving table according to an embodiment of the present invention.

The fast moving table 5, 6 is for single-side charging and discharging.

Figure 4:
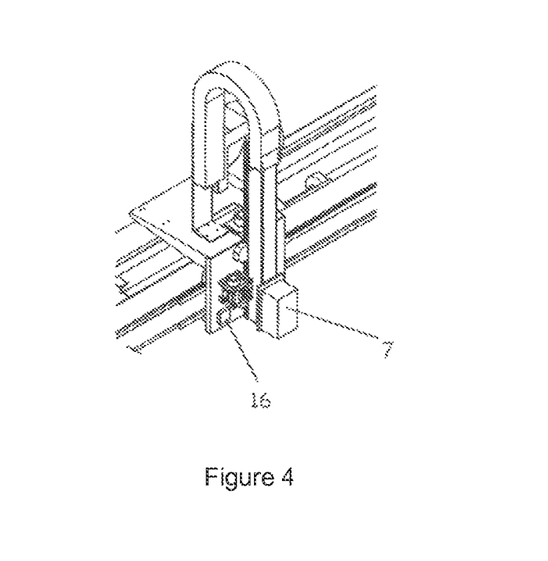
FIG. 4 is a schematic view showing the positions of a laser cutting head and a sensor according to an embodiment of the present invention.

A moving mechanism of the laser cutting head 7 is in the form of a rectangular-coordinate robot, and can move in X-, Y- and Z-direction.

In addition, the present invention is further provided with a 2D sensor 16. The 2D sensor 16 is arranged on the moving mechanism of the laser cutting head 7, coupled to a laser cutting controller, and used for measuring the position of each block on the two fast moving table cutting stations 51, 61. The measured data are processed and computed by a controller to obtain the offset from origin and deflection angle of the placement station of the block so as to perform automatic correction of the cutting path.

Figure 2:
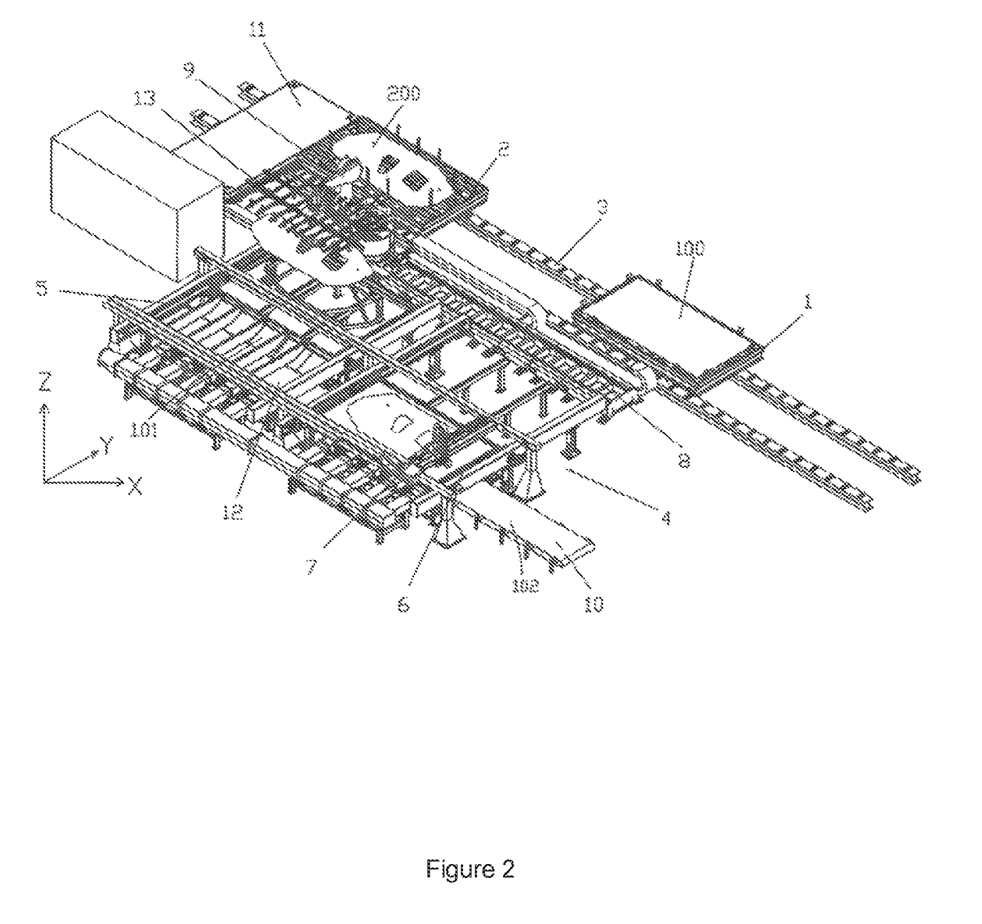
FIG. 2 is perspective schematic view of an embodiment of the present invention.

In a metal plate loading/unloading and cutting method of the present invention, firstly blocks 100 are laid out according to the shape of sheets 200, and conveyed and stacked by a block cart 1; a block at a stacking station is carried by a carrying and stacking robot 9 to a waiting station of a first fast moving table 5, then the block is moved by the first fast moving table 5 to a cutting station, the block at the cutting station is cut into sheets by a laser cutting head 7 along a predetermined cutting path, and at the same time a block is carried by the carrying and stacking robot 9 to a waiting station of a second fast moving table 6; after the completion of cutting on the first fast moving table 5, the laser cutting head 7 moves to a cutting station of the second fast moving table 6 to perform cutting, and at the same time the cut sheets on the first fast moving table 5 are moved to the waiting station and then carried by the carrying and stacking robot 9 to a sheet cart 2 for conveying to the outside, stacking and package; this process is repeated, blocks and sheets are alternately moved by the first and second fast moving tables 5, 6 into and out of the cutting stations, and the laser cutting head 7 moves between the cutting stations of the first and second fast moving tables 5, 6 to accomplish cutting of the blocks; and the cut-away waste material is moved out of the cutting operation unit 4 by a waste material conveying device 10 below the cutting stations.

Furthermore, the present invention also adopts a liner die design, in which the liner die corresponds to the blocks laid out according to the shape of the sheets and the recyclable waste material, a support device is arranged on the liner die below the positions corresponding to the sheets and the recyclable waste material, and the rest of the liner die is a hollow left for blanking; and the liner die is disposed at the cutting station of a fast moving table, blocks are supplied as a stack to a block stacking station, a block is picked up, by the carrying and stacking robot, from the stacking station to the liner die of the cutting operation unit, and the laser cutting performs a cutting operation on the block to form required sheets.

Figure 6:
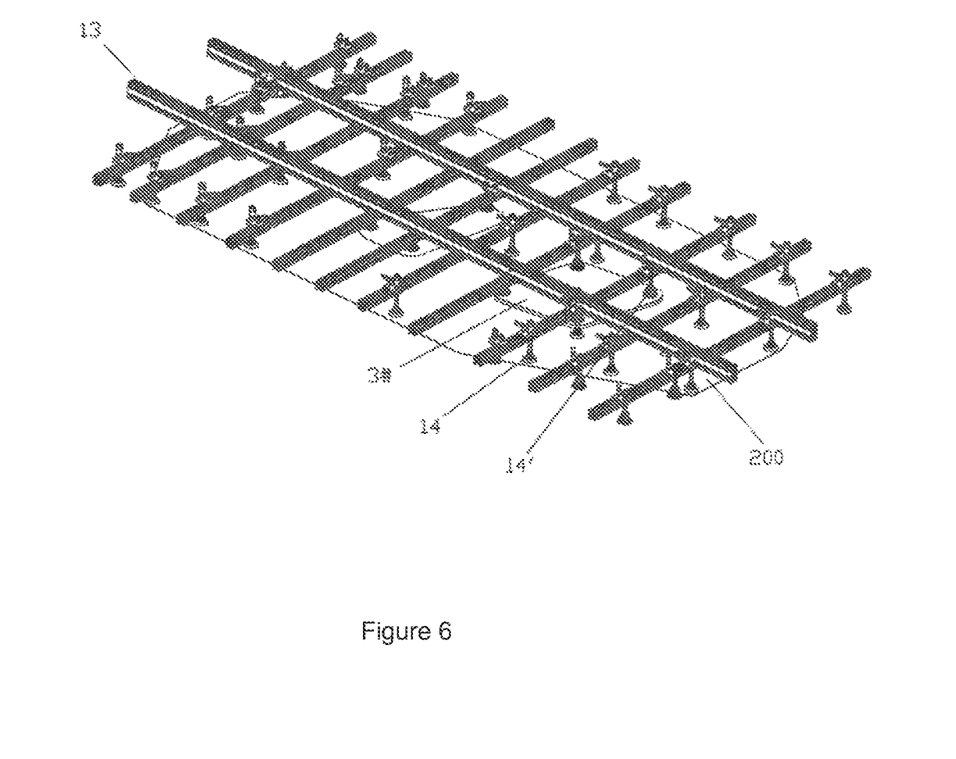
FIG. 6 is a schematic view showing how a vacuum sucker of an end effector sucks up a sheet according to an embodiment of the present invention.

Also, the carrying and stacking robot 9 uses an end effector 13 for picking up and placing operations.

The end effector 13 performs picking up and placing operations by way of a vacuum sucker.

In addition, the liner die of the present invention is processed from an aluminium profile, and accordingly one liner die is at least suitable for more than one kinds of sheets.

The carrying and stacking robot picks up and places the block by way of a vacuum sucker. One robot has functions of both carrying and stacking, and is responsible for carrying a block to the cutting station and picking up sheets and carrying same to the stacking cart. If there is waste material in size larger than 300 mm×300 mm during cutting, the robot will carry the waste material to a reusable waste material cart, the waste material will be picked up together with the sheets from the cutting station, and the other waste materials will directly fall below the liner die and pass through the waste material chute to be conveyed by the waste material conveying belt.

This embodiment is designed for blocks of 3,700 mm×1,850 mm at maximum.

The liner die is designed for blocks of 3,700 mm×1,850 mm at maximum and depending on the distribution of sheets, is assembled from aluminium profiles, and is designed to facilitate blanking and recovering of the waste material. For the reusable waste material, a support link is designed accordingly for the liner die to prevent the reusable waste material from falling onto the waste material conveying belt.

The moving mechanism of the laser cutting head in the form of a rectangular-coordinate robot operates in a longitudinal operating travel, with a working area in the lengthwise direction X of 9,000 mm, a working area in the widthwise direction Y of 2,000 mm, and a working area in the height direction Z of 400 mm.

The work flow of the laser blanking is as follows:

the carrying and stacking robot picks up a first block from the block cart, the first fast moving table is located at the unloading position and waits for loading, the robot carries the block and place it onto the first fast moving table of the cutting operation unit, and when unloading, the laser cutting head is located at the to-be-cut position;

the first fast moving table moves to the cutting station, and the laser cutting head cuts the first block along a predetermined cutting path; and at the same time, the carrying and stacking robot picks up a second block from the block cart, and carries and places same onto the second fast moving table, and then the fast moving table moves to the cutting station.

When the cutting of the first block is finished, the laser cutting head moves to the second fast moving table, and cuts the second block along a predetermined cutting path;

When the cutting of the first block is finished, the first fast moving table moves to a picking/placement station, and the robot picks up a first sets of sheets and stacks the sheets to the sheet cart. After the first set of sheets is stacked, the carrying and stacking robot moves to the block cart, picks up a third block, and carries and place the third block onto the first fast moving table of the cutting operation unit, and then the fast moving table moves to the cutting station.

When the cutting of the second block is finished, the laser cutting head moves to the first fast moving table, and cuts the third block along a predetermined cutting path.

When the cutting of the second block is finished, the second fast moving table moves to the picking/placement station, and the robot picks up a second sheet and stacks same to the sheet cart. After the second sheet is stacked, the robot moves to the block cart, picks up a fourth block, and carries and place same onto the second fast moving table of the cutting operation unit, and then the fast moving table moves to the cutting station.

When the cutting of the third block is finished, the laser cutting head moves to the second fast moving table, and cuts the fourth block along a predetermined cutting path;

When the cutting of the third block is finished, the first fast moving table moves to the picking/placement station, and the robot picks up a third sheet and stacks same to the sheet cart. After the third sheet is stacked, the robot moves to the block cart, picks up a fifth block, and carries and place same onto the first fast moving table of the cutting operation unit, then the fast moving table moves to the cutting station, and the fifth block is to be cut by the laser cutting head.

When the cutting of the fourth block is finished, the laser cutting head moves to the first fast moving table, and cuts the fifth block along a predetermined cutting path.

When the cutting of the fourth block is finished, the second fast moving table moves to the picking/placement station, and the robot picks up a fourth sheet and stacks same to the sheet cart.

Thus, the laser cutting head reciprocates between the first and second moving tables, and the carrying and stacking robot performs cyclic loading and unloading operations on the two fast moving tables at the picking/placement station. The fifth block is cut, a fourth sheet is unloaded and stacked, and a sixth block is loaded; the sixth block is cut, a fifth sheet is unloaded and stacked, and a seventh block is loaded; the seventh block is cut, a sixth sheet is unloaded and stacked, and an eighth block is loaded; . . . .

In addition, the 2D sensor mounted at an edge of the laser cutting head detects each of the blocks on the cutting table. The relative position of the cut block relative to the threeaxis digital control laser cutting system is measured to correct errors generated during stacking, carrying and placement, etc.

In addition, the waste material falls onto the waste material conveying belt through the void of the liner die during cutting and is carried to the outside. When there is a waste material in size larger than 300 mm×300 mm during cutting, the carrying and stacking robot picks up the reusable waste material along with a sheet, and the robot places the sheet onto the can at the stacking station and then places the reusable waste material onto the waste material cart to form a waste material stack. Finally, the robot returns back to the block cart to pick up a block.

In addition, the cutting flue gas in the steel plate cutting process is subjected to a segmented separation by a flue gas chamber and sucked, and is drawn away through a flue gas suction pipe arranged at one side of the cutting platform.

In the present embodiment, the block is a single-sheet block for a body side outer panel, as shown in FIG. 5, and the shape of the liner die designed for this block is illustrated by the dotted lines. The body side outer panel 21 has dimensions in length and width of 2985 mm×1585 mm, and is in a shape as illustrated by the solid lines in FIG. 5. The number of sheets to be cut from each of the other blocks is shown in Table 1. The body side outer panel has four inner waste-material portions corresponding to waste materials 1#, 2#, 3# and 4#, in which the waste material 3# is a reusable waste material to be recycled which is larger than 300 mm×300 mm and is to be picked up to the waste material stacking station by the carrying and stacking robot. Therefore, the liner die 15 is provided with a support device 151 below the waste material 3#, which can prevent the reusable waste material from falling onto the waste material conveying belt.

Table 1 shows the number of sheets to be cut from a block according to an embodiment of the present invention.

| Number | Item Name | Number of sheets to be cut from a block |
|---|---|---|
| ① | Engine inner panel | 3 |
| ② | Fender panel right/left | 3 |
| ③ | Body side inner panel right/left | 1 |
| ④ | Body side rear inner panel right/left | 1 |
| ⑤ | Body side outer panel right/left | 1 |
| ⑥ | Body side | 1 |
| ⑦ | A-pillar upper hinge plate right/left | 6 |

In this embodiment, two vacuum suckers 14 and 14' having a height difference are mounted on the end effector 13 of the carrying and stacking robot of the present invention, as shown in FIG. 6, and respectively used for sucking and picking up a body side outer panel sheet 200 and a reusable waste material 3#, the sheet and the reusable waste material form a height difference by means of the suckers to ensure separation of the cut edges, and after unloading the sheet, the robot further places the reusable waste material onto the waste material stacking station.

The present invention can produce metal sheets with good cut cross-section, make use of waste materials, save raw materials, increase the material utilization, and further enlarge the range of materials to be machined. The present invention changes the machining cutting method and system in an original steel plant, has a production line having a small occupied area and low costs in equipment investment, and can meet the requirement of production of small-batch vehicle models.

What is claimed is:

1. A metal plate loading/unloading and cutting system, comprising:
    a block cart and a sheet cart, both of which are arranged on a guide rail;
    a cutting operation unit arranged at one side of the guide rail, the cutting operation unit comprising a first and a second fast moving table arranged in parallel and a laser cutting head, the first and the second fast moving tables being arranged perpendicular to the guide rail and each provided with a cutting station and a waiting station, the laser cutting head moving over the two cutting stations along its guide rail, and the waiting stations corresponding to the side of the guide rail of the block cart and the sheet cart;
    a carrying and stacking robot arranged between the cutting operation unit and the guide rail of the block cart and the sheet cart, a robot external shaft being parallel to the cart guide rail and extending over the waiting stations of the first and second fast moving tables of the cutting operation unit; and
    a waste material conveying device disposed below the two cutting stations of the cutting operation unit.

2. The metal plate loading/unloading and cutting system as claimed in claim 1, wherein a replaceable liner die is provided on the cutting station, a support device is arranged on the liner die below the position corresponding to the sheets and the recyclable waste material, and the rest of the liner die is a hollow left for blanking.

3. The metal plate loading/unloading and cutting system as claimed in claim 1, further comprising a recyclable waste material cart adjacent to the sheet cart.

4. The metal plate loading/unloading and cutting system as claimed in claim 3, wherein the recyclable waste material cart is coupled to the sheet cart.

5. The metal plate loading/unloading and cutting system as claimed in claim 3, wherein the recyclable waste material cart and the sheet cart share a rail.

6. The metal plate loading/unloading and cutting system as claimed in claim 1 further comprising at least one segmented flue arranged corresponding to the two cutting stations of the cutting operation unit.

7. The metal plate loading/unloading and cutting system as claimed in claim 1, wherein the waste material conveying device comprises a waste material chute arranged below the cutting stations and a corresponding waste material conveying belt for conveying the waste material to the outside.

8. The metal plate loading/unloading and cutting system as claimed in claim 1, wherein the first and second fast moving tables are for single-side feeding and discharging.

9. The metal plate loading/unloading and cutting system as claimed in claim 1, wherein a moving mechanism of the laser cutting head is in the form of a rectangular-coordinate robot, and is movable in X-, Y- and Z-direction.

10. The metal plate loading/unloading and cutting system as claimed in claim 1, further comprising a 2D sensor arranged on the moving mechanism of the laser cutting head, the 2D sensor being coupled to a laser cutting controller.

11. A metal plate loading/unloading and cutting method, comprising the following steps:
    firstly laying out blocks according to the shape of sheets, and conveying and stacking the blocks by the block cart;
    carrying the block by a carrying and stacking robot from a stacking station to a waiting station of a first fast moving table, then moving the block by the first fast moving table to a cutting station, wherein the block at the cutting station is cut into sheets by a laser cutting head along a predetermined cutting path, and at the same time a block is carried by the carrying and stacking robot to a waiting station of a second fast moving table;

moving the laser cutting head to a cutting station of the second fast moving table to perform cutting after the completion of cutting on the first fast moving table, and at the same time moving the cut sheets on the first fast moving table to the waiting station and then carrying the cut sheets by the carrying and stacking robot to a sheet cart for conveying to the outside, stacking and packaging;

repeating the above steps so that blocks and sheets are alternately moved by the first and second fast moving tables into and out of the cutting stations, and the laser cutting head moves between the cutting stations of the first and second fast moving tables to accomplish cutting of the blocks; and moving the cut-away waste material out of the cutting operation unit by a waste material conveying device below the cutting stations.

12. The metal plate loading/unloading and cutting method as claimed in claim 11, further comprising:

adopting a liner die design, wherein the liner die corresponds to the blocks laid out according to the shape of the sheets and the recyclable waste material, and a support device is arranged on the liner die below the positions corresponding to the sheets and the recyclable waste material, and the rest of the liner die is a hollow left for blanking; and disposing the liner die at the cutting station of a fast moving table, blocks are supplied as a stack to a block stacking station, picking up, by the carrying and stacking robot, a block from the stacking station to the liner die of the cutting operation unit; and performing, by the laser cutting head, a cutting operation on the block to form required sheets.

13. The metal plate loading/unloading and cutting method as claimed in claim 11, wherein the carrying and stacking robot uses an end effector for picking up and placing operations.

14. The metal plate loading/unloading and cutting method as claimed in claim 13, wherein the end effector performs picking up and placing operations by way of a vacuum sucker.

15. The metal plate loading/unloading and cutting method as claimed in claim 11, wherein a recyclable waste material cart is further provided which is arranged adjacent to the sheet cart, and the recyclable waste material cart and the sheet cart move in and out simultaneously or successively.

16. The metal plate loading/unloading and cutting method as claimed in claim 12, wherein the liner die is processed from an aluminium profile.

17. The metal plate loading/unloading and cutting method as claimed in claim 11, wherein one liner die is suitable for more than one kind of sheets.

* * * * *